N. NUCKOLLS.
Straw Cutter.
No. 8,638.
Patented Jan. 6, 1852.
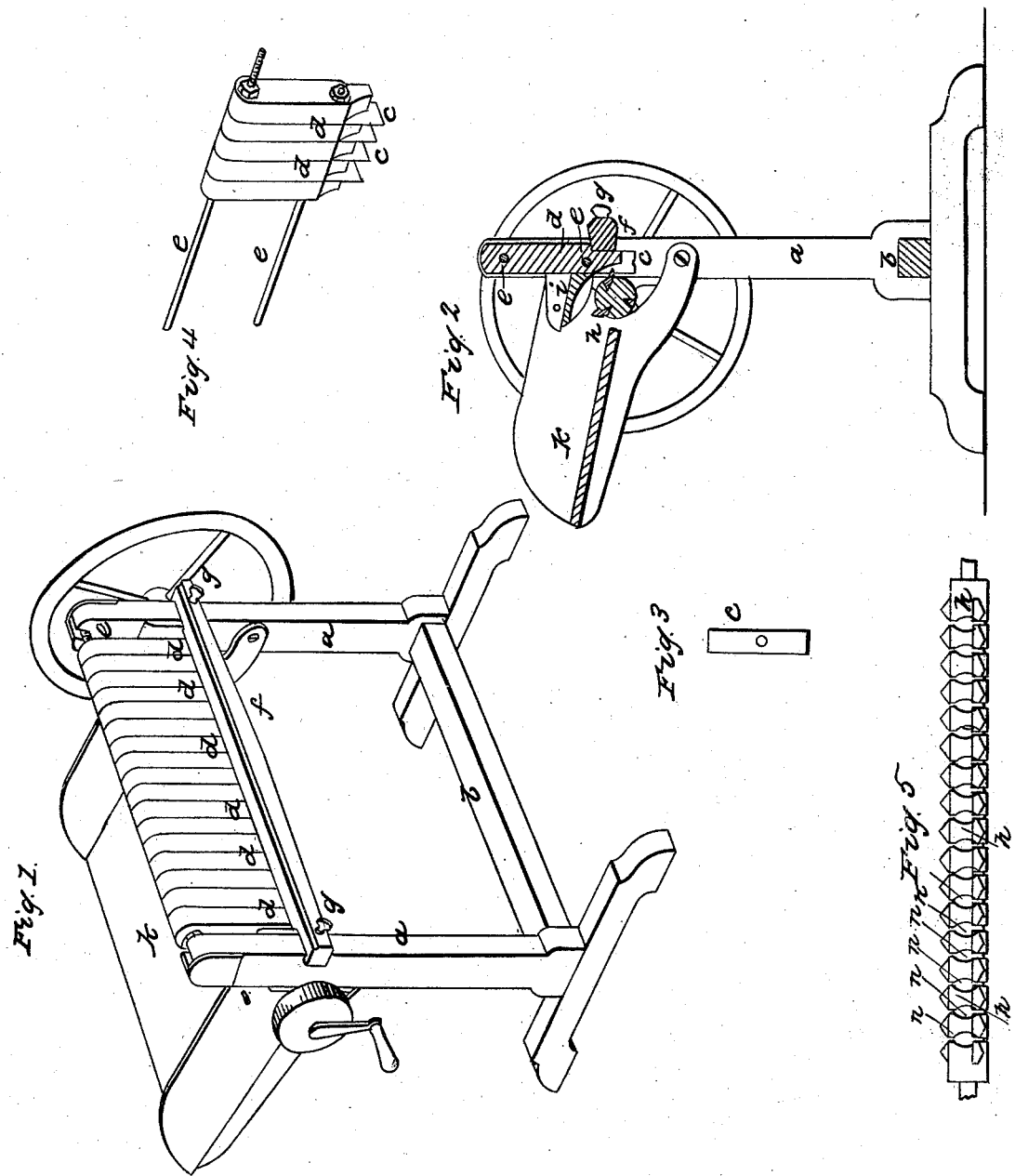

UNITED STATES PATENT OFFICE.

NATHL. NUCKOLLS, OF COLUMBUS, GEORGIA.

FEEDING-ROLLERS IN STRAW-CUTTERS.

Specification of Letters Patent No. 8,638, dated January 6, 1852.

*To all whom it may concern:*

Be it known that I, NATHANIEL NUCKOLLS, of Columbus, in the county of Muscogee and State of Georgia, have invented certain new and useful Improvements in Machinery for Cutting Straw, and that the following is a full, clear, and exact description of the principle or character which distinguishes them from all other things before known and of the usual manner of making, modifying, and using the same, reference being had to the accompanying drawing, making a part thereof, in which—

Figure 1, represents a perspective view. Fig. 2, a sectional view, and Figs. 3, 4, and 5, views in detail of several parts of the machinery.

My improvement consists in presenting the straw sidewise to the knives and causing it to move against stationary knives when cutting, instead of moving the knives against the straw.

The construction is as follows: A suitable frame is made, composed of two uprights (*a*) supported by cross sills, or feet into which they are mortised and connected together near the bottom by a bar (*b*). The posts or uprights (*a*) are about three feet high, and are placed as far apart as the longest straw intended to be cut; at the top of the posts a gang of stationary knives are placed, constructed as follows: A sufficient number of blades (*c*), one of which is shown detached in Fig. 3, are made of hardened steel, broad and flat, the edges being either straight or curving, in fact they are similar to a section of a scythe blade, with a bevel on each side; a hole is made through their center; each of these blades is placed between two blocks of wood (*d*) about a half an inch thick, more or less; a rod passes through the blocks and blades, they being strung upon it alternately, as shown in Fig. 4, in which a portion of them are represented in perspective; these together extend from one post to the other of the frame, and form what I denominate the breast; this is supported by a stout rod (*e*) that passes through the upper ends of blocks (*d*) and screws together with the rod (*e'*) before named, to bind the whole together, and hold the knives firmly in place, a screw and nut being furnished at either end of the rod (*e*) which projects far enough beyond the ends of the breast, to enter bearings in the post, and from journals on which the breast can be supported and turned up when the knives are to be sharpened, and this arrangement enables me to shift up the knives as they are worn away by grinding or to turn them end for end. To the back side of the breast I attach a stay beam or bar (*f*) that extends from one post (*a*) to the other, and is attached thereto by hand screws (*g*) to hold it firmly in place when cutting. Just in front of the breast is a cylinder (*h*) (shown as detached Fig. 5) made of wood or iron, and having its bearings in the post in front; this cylinder has as many grooves in it as there are knives, and between the grooves are projecting pin teeth, straight on their face and projecting in an elliptic form, as distinctly shown in the drawing; the pin teeth are placed in straight lines from end to end, and there should be from three to six rows more or less in the circumference of the cylinder; behind each tooth the groove marked *n*, on the drawing is enlarged, and this enlargement causes any gumming matter that would lodge in the groove to drop out immediately after the teeth of the cylinder pass the knives, and this enlargement forms the principal feature of my invention. Directly above the cylinder there is a concave cap (*i*) to aid in conducting the straw to the knives; a feed board (*k*) is attached in front of the cylinder on which the straw is fed to the machine or an endless apron may be substituted therefor. The cylinder may be driven by crank or pulley in any convenient way, according to the size of the machine and to regulate the motion a fly wheel is also added to its axis.

Having thus fully described my improved straw cutter, what I claim therein as my invention, and for which I desire to secure Letters Patent, is—

The enlargement of the knife grooves *n*, on the feeding cylinder in the manner and for the purposes set forth.

NATHANIEL NUCKOLLS.

Witnesses:
THOMAS RAGLAND,
WM. H. GRISWOLD.